Jan. 8, 1929.

L. FISCHER 1,698,585

LABELING AND STAMPING MACHINE

Filed Dec. 29, 1926

Inventor
Louis Fischer

By
[signature]
Attorney

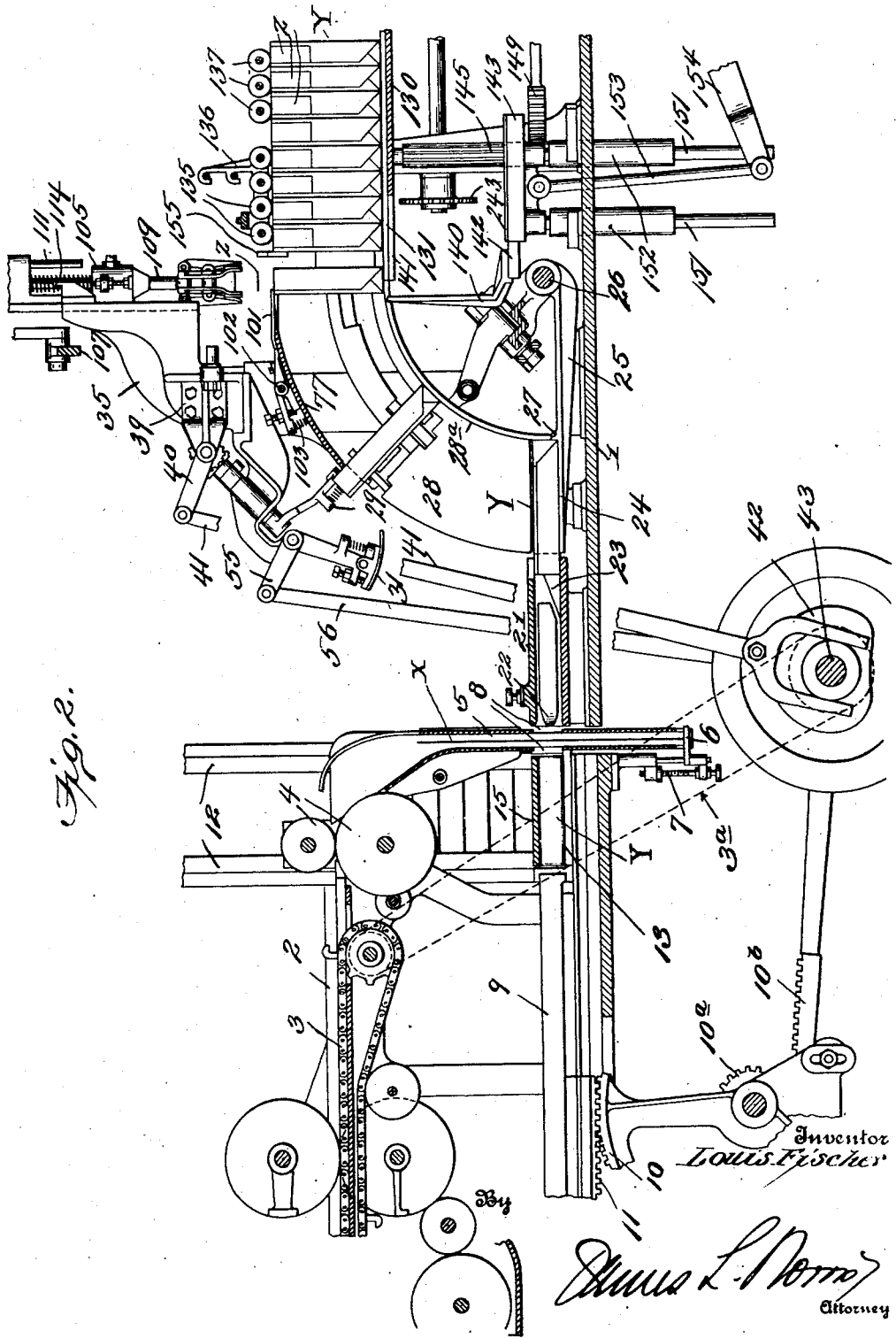

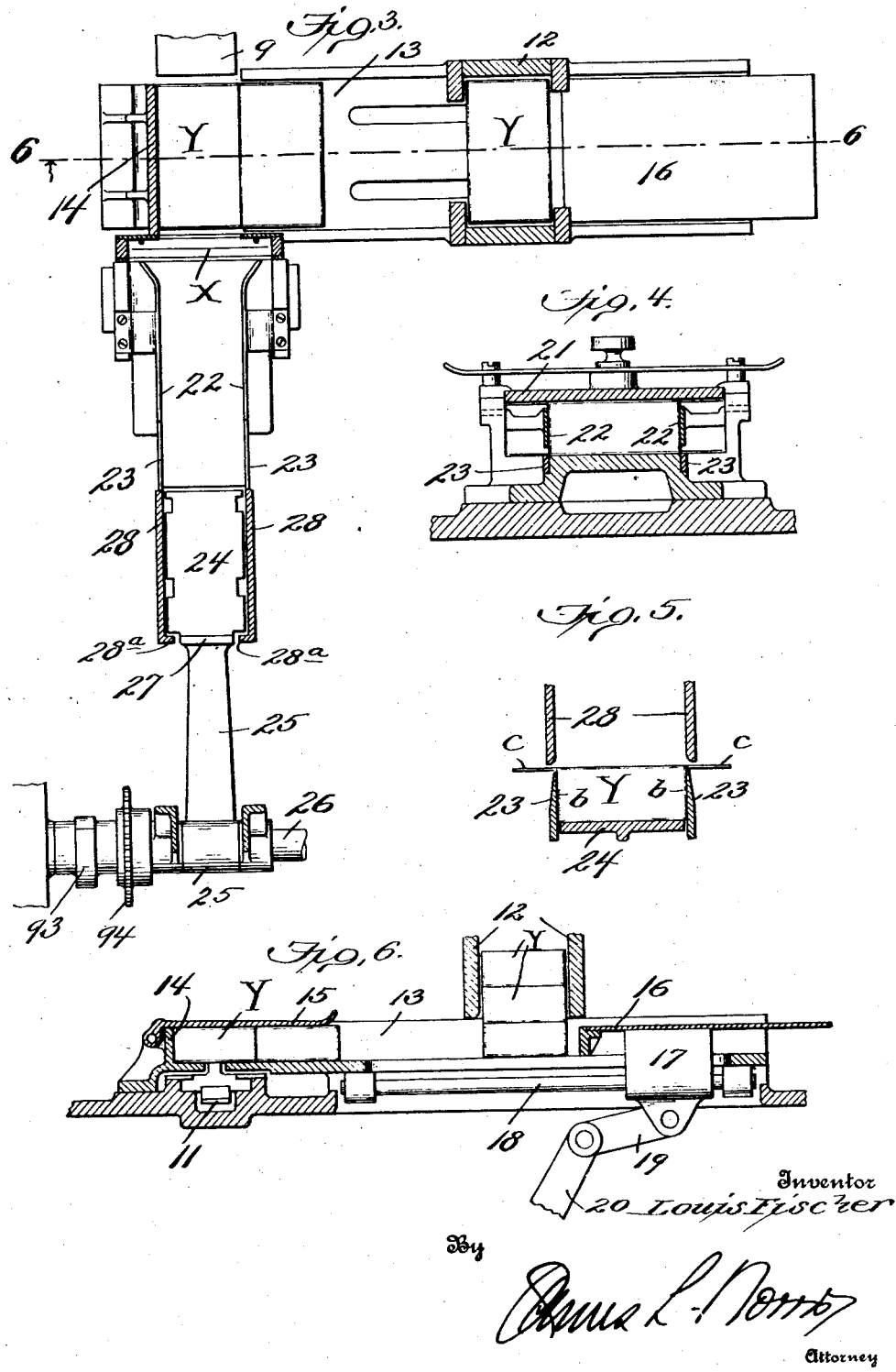

Jan. 8, 1929.  1,698,585
L. FISCHER
LABELING AND STAMPING MACHINE
Filed Dec. 29, 1926   13 Sheets-Sheet 4
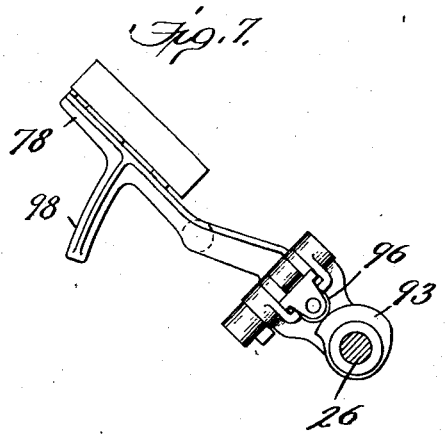
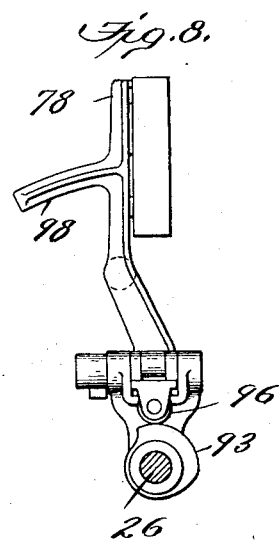
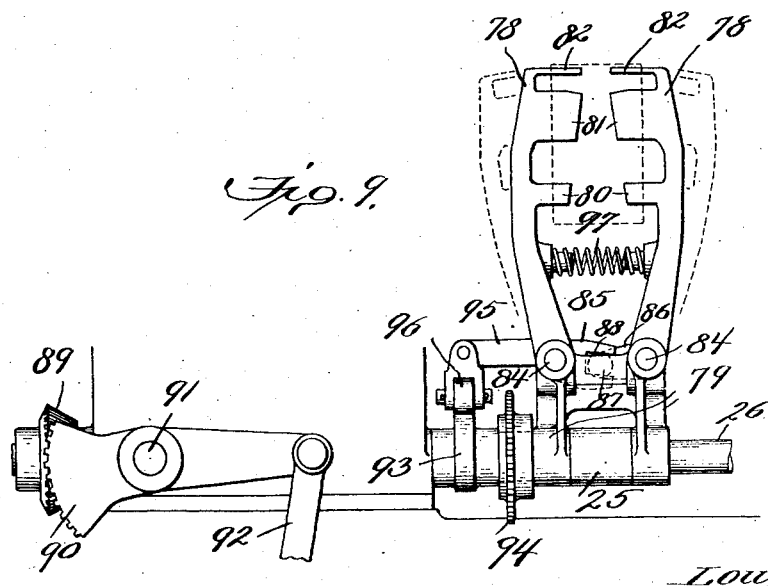
Inventor
Louis Fischer
By
Attorney Jan. 8, 1929.  
L. FISCHER  
1,698,585  
LABELING AND STAMPING MACHINE  
Filed Dec. 29, 1926    13 Sheets-Sheet 5
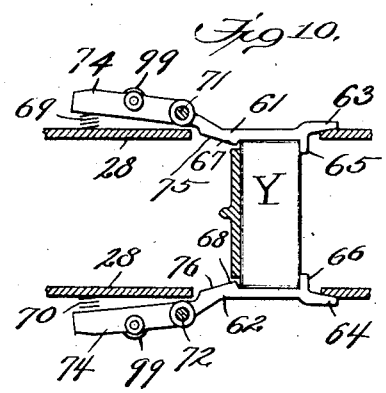
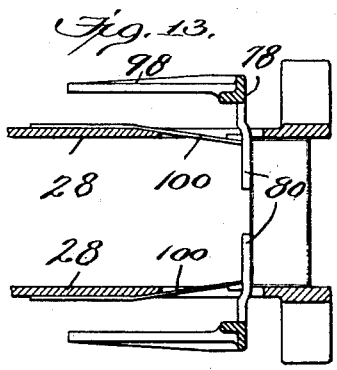
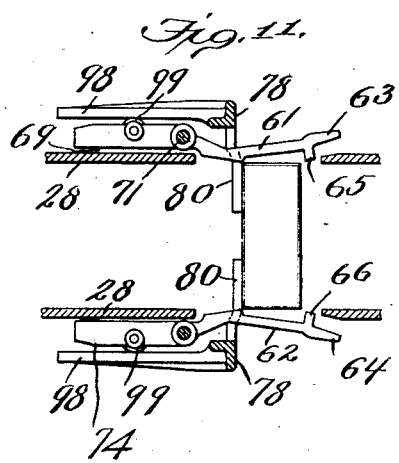
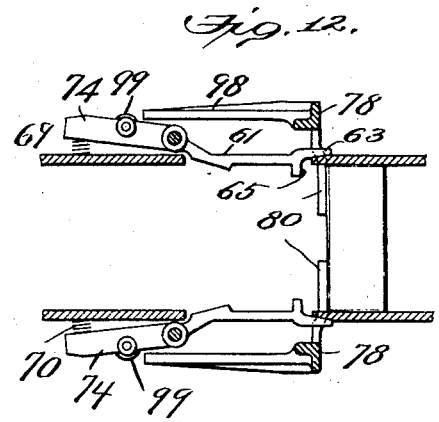
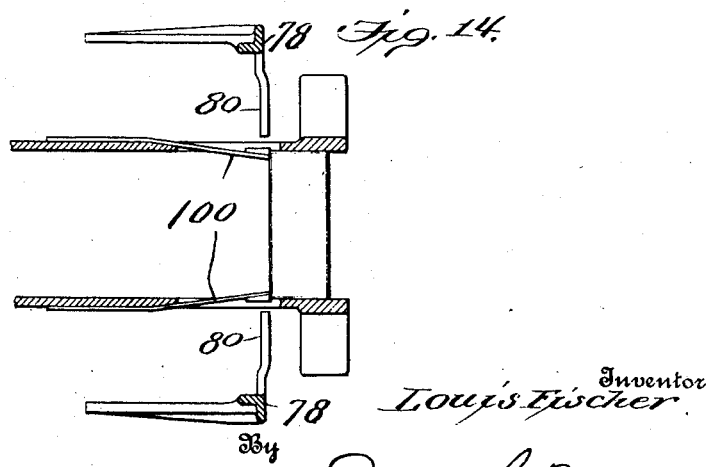
Inventor  
Louis Fischer  
Attorney Jan. 8, 1929.
L. FISCHER
1,698,585
LABELING AND STAMPING MACHINE
Filed Dec. 29, 1926    13 Sheets-Sheet 6
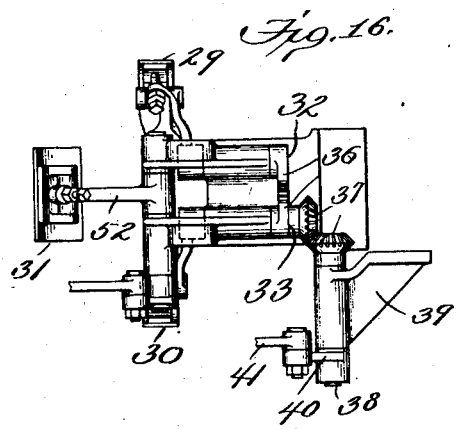
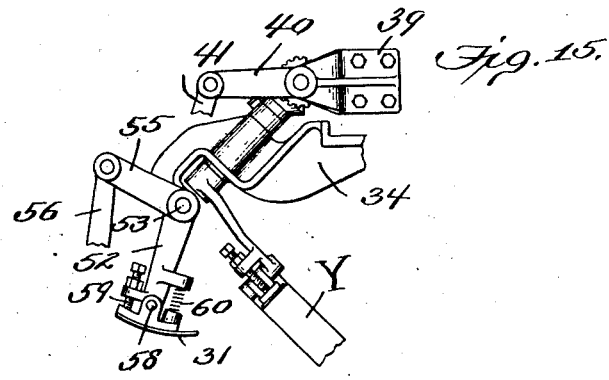
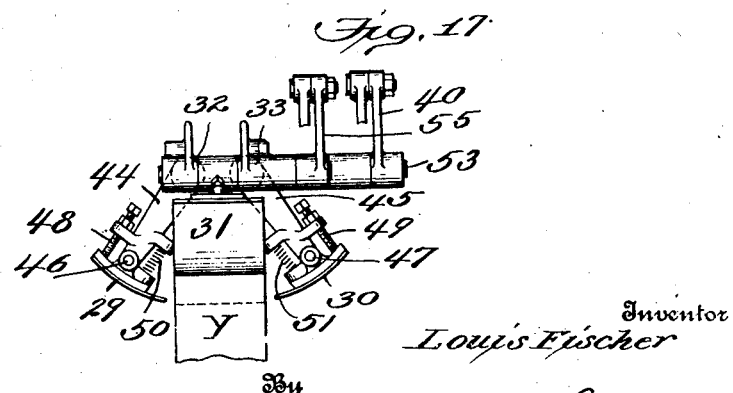
Inventor
Louis Fischer
By
Attorney Jan. 8, 1929.  1,698,585

L. FISCHER

LABELING AND STAMPING MACHINE

Filed Dec. 29, 1926  13 Sheets-Sheet 7

Inventor
Louis Fischer
By
Attorney

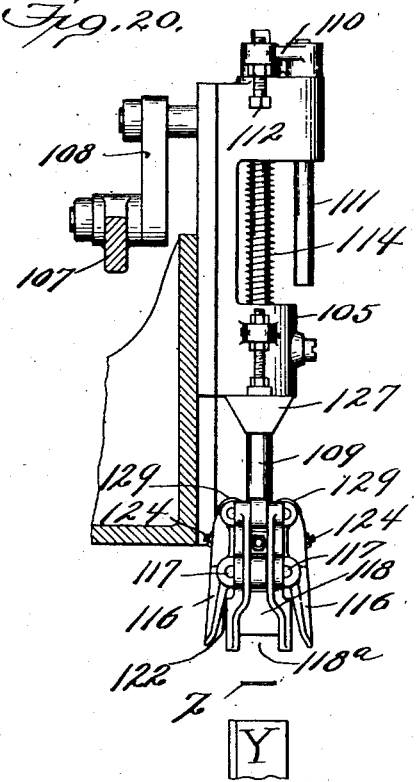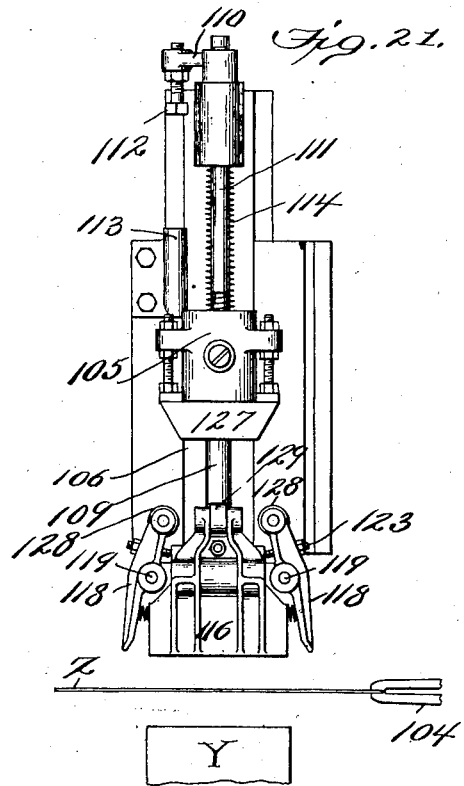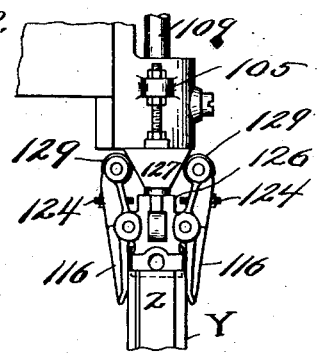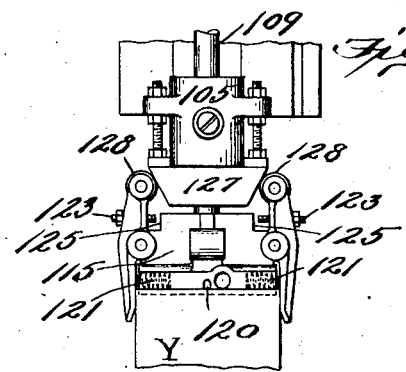

Jan. 8, 1929. 1,698,585
L. FISCHER
LABELING AND STAMPING MACHINE
Filed Dec. 29, 1926   13 Sheets-Sheet 9
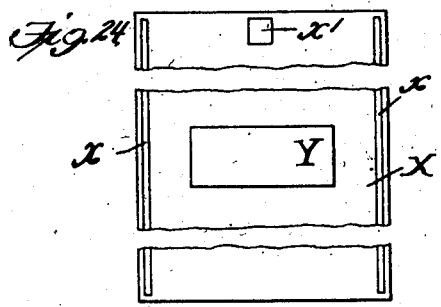
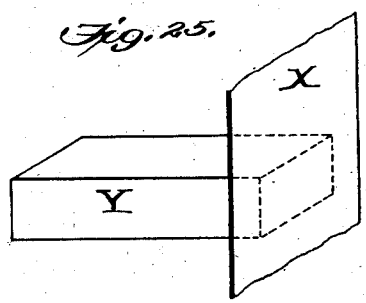
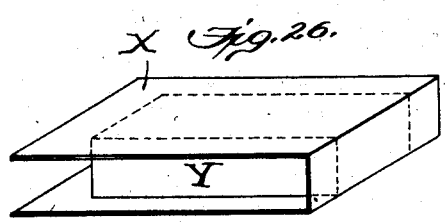
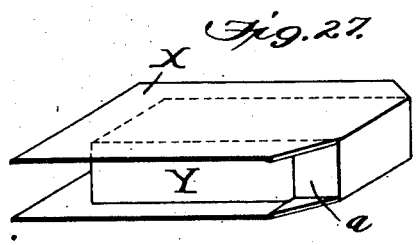
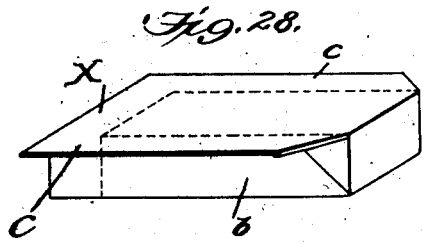
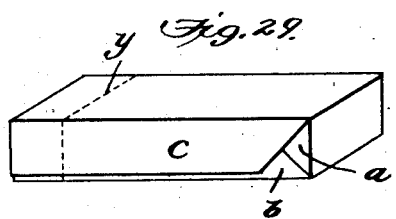
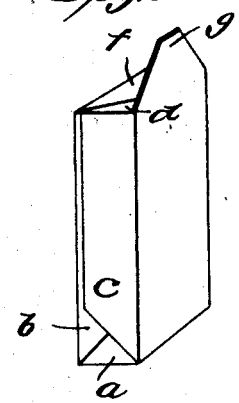
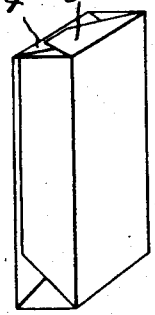
Inventor
Louis Fischer
By
Attorney

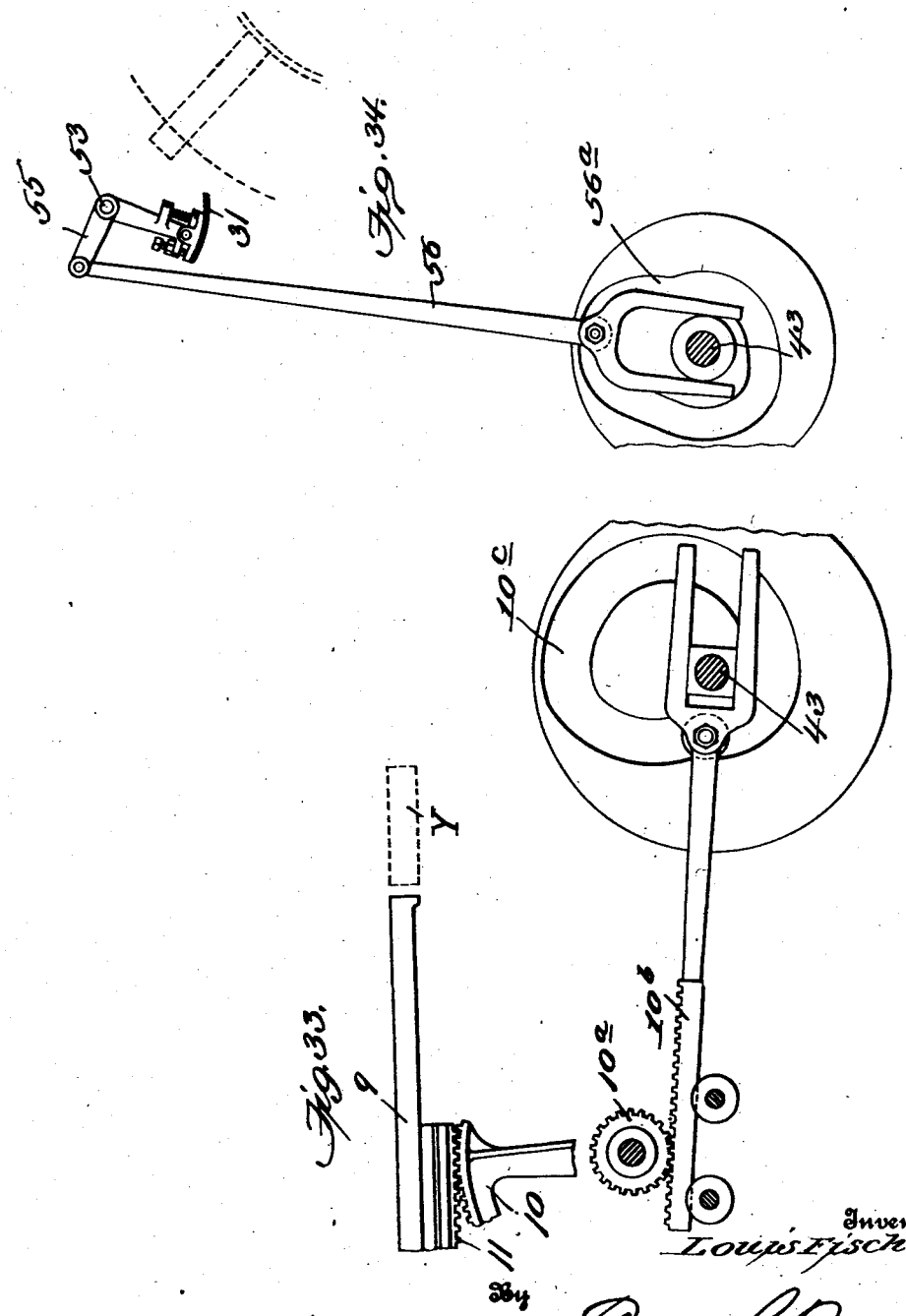

Jan. 8, 1929.　　　　　　　　　　　　　　　1,698,585
L. FISCHER
LABELING AND STAMPING MACHINE
Filed Dec. 29, 1926　　　13 Sheets-Sheet 11

Inventor
Louis Fischer
By
James L. Norris
Attorney

Jan. 8, 1929. 1,698,585
L. FISCHER
LABELING AND STAMPING MACHINE
Filed Dec. 29, 1926 13 Sheets-Sheet 13
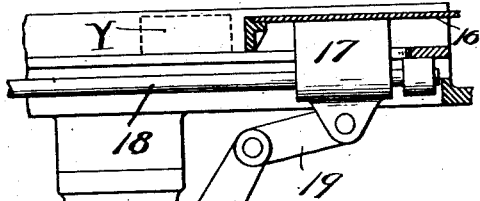
Fig. 38.
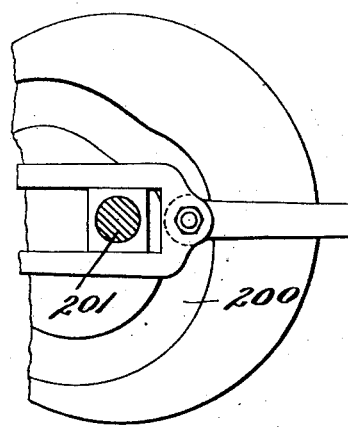
Fig. 39.
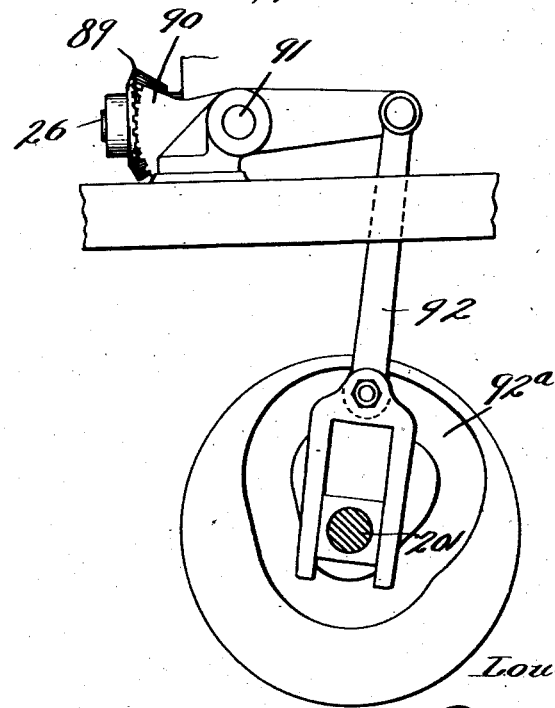
Inventor
Louis Fischer
By
Attorney Patented Jan. 8, 1929.

1,698,585

UNITED STATES PATENT OFFICE.

LOUIS FISCHER, OF PHILADELPHIA, PENNSYLVANIA, ASSIGNOR TO WRIGHT'S AUTOMATIC TOBACCO PACKING MACHINE COMPANY, OF DURHAM, NORTH CAROLINA, A CORPORATION OF WEST VIRGINIA.

LABELING AND STAMPING MACHINE.

Application filed December 29, 1926. Serial No. 157,788.

The present invention relates to improvements in machines for applying labels or similar outer wrappers and also stamps, such as revenue stamps, to packages, as for example tobacco pouches, and the primary object is to provide a novel and improved machine of this class which is capable of operating rapidly and efficiently to perform both operations of applying the labels or outer wrappers and applying or affixing the stamps to the labeled packages, separate machines for performing these two operations being thereby rendered unnecessary and the combined machine being capable of operation with greater facility and less expense than has been possible where a separate labeling machine and a separate stamping machine were used, as heretofore.

Another object of the invention is to provide novel and improved mechanisms for folding the ends of the labels or wrappers applied to the packages, and for applying the stamps to the labeled packages, and mechanisms for bringing the packages to the folding and stamping positions and for removing the stamped packages from the latter position whereby rapidity and certainty in operation and uniformity in the labeled and stamped packages are assured.

A further object of the invention is to provide novel and improved means for crimping the end folds of the packages whereby permanency of the closures is attained and the end folds are given a set which holds them in closed position, thereby facilitating the affixing of the stamps to such ends of the packages.

To these and other ends, the invention consists in certain improvements and combinations and arrangements of parts, all as will be hereinafter more fully described, the features of novelty being pointed out particularly in the claims at the end of the specification.

In the accompanying drawings:—

Figure 2 represents a vertical longitudinal section through the machine as shown in Figure 1, showing the mechanisms for feeding the packages and the labels or wrappers to the machine, and also showing operating means for the mechanisms of the machine.

Figure 3 represents a horizontal section through the label and package-feeding means, the section being taken on the line 3—3 of Figure 1.

Figure 4 represents a vertical section through the label-folding mechanism, taken on the line 4—4 of Figure 1.

Figure 5 represents a vertical section on the line 5—5 of Figure 1 showing the partly folded label or wrapper.

Figure 6 represents a vertical section through the package-feeding means on the line 6—6 of Figure 3.

Figure 7 is a side elevation of the carrier which transfers the labeled package from the label end-folding position to the stamping position, the carrier in this figure being shown in position to receive the package occupying the label end-folding position.

Figure 8 is a view similar to Figure 7, showing the carrier swung upwardly to bring the package to the stamping position.

Figure 9 shows the carrier as viewed from the right in Figure 8, the members of the carrier being shown in package-advancing position by the full lines and in package-clearing position by the dotted lines.

Figure 10 is a detail sectional view showing the fingers which receive and hold the package in position for folding the ends of the wrapper thereon, this view also showing the carrier which brings the package into the label end-folding position.

Figure 11 shows the fingers released by the carrier which transfers the packages to the stamping position.

Figure 12 is a view similar to Figure 11 showing the package removed from the fingers which held it in end-closing position, the package being shown on its way to stamping position.

Figure 13 shows the package after it has reached the stamping position, the transfer carrier being still engaged with the package.

Figure 14 is a view similar to Figure 13, showing the package held in the stamping position by the spring dogs and showing the members of the transfer carrier retracted from the package.

Figure 15 is a side elevation in detail of the mechanism which folds and closes the upper end of the label or wrapper.

Figure 16 shows the label end-folding mechanism as viewed from the upper left hand side of Figure 15.

Figure 17 shows the label end-folding mechanism as viewed from the lower left hand side of Figure 15.

Figure 20 is a side elevation of the mechanism which affixes a stamp across the upper end of the labeled package and indents such end of the package and creases the folds which close it.

Figure 21 is an elevation of the stamp affixing and indenting and crimping mechanism as viewed from the right in Figure 20.

Figure 22 is a side elevation of a portion of the mechanism shown in Figure 20, the mechanism being lowered on the end of the package to press the same thereon to indent the end of the package, and to crease the end folds of the wrapper, one of the crimping members being omitted for clearness in illustration.

Figure 23 is an elevation of the mechanism shown in Figure 22 as viewed from the right in that figure, one of the crimping members being omitted for clearness in illustration.

Figure 24 is a diagrammatic view illustrating the manner in which the label or outer wrapper is gummed and is engaged by the package prior to the folding of the label or wrapper thereon;

Figure 25 is a perspective view illustrating the manner in which the label or outer wrapper is first engaged by the package;

Figure 26 is a diagrammatic view in perspective showing the first fold of the label on the package;

Figure 27 is a view similar to Figure 26 but showing the lower corner folds of the label;

Figure 28 is a view similar to Figures 26 and 27 but showing the first longitudinal fold of the label;

Figure 29 is a perspective view of the package and a label thereon after the second longitudinal fold has been made;

Figure 30 is a perspective view of a package and a label thereon, showing the first end folds of the label;

Figure 31 is a view similar to Figure 30, showing the second end fold;

Figure 32 is a view similar to Figures 30 and 31 but showing the third or final end fold, this figure showing the labeled package ready to receive the stamp.

Figure 33 is a detail view of the driving means for the package transfer slide;

Figure 34 is a detail of the driving means for one of the end folders;

Figure 38 is a detail view showing the driving means for the package feeding plunger; and Figure 39 is a detail view showing the driving means for the mechanism which advances the packages to end folding and stamping positions.

Similar parts are designated by the same reference characters in the several views.

Label-applying and stamp-affixing machines embodying the present invention are capable of use generally where it is desired to apply a label or a similar outer wrapper to a package and to affix a stamp or an equivalent therof to the folded or closed end of the label or wrapper. The invention is particularly applicable to the labeling of tobacco packages or pouches and the affixing of the revenue stamps thereto, the machine shown in the accompanying drawings being adapted to that particular application of the invention. While the invention is shown in its preferred form in the accompanying drawings, and such embodiment will be hereinafter described in detail, it is to be understood that the invention is not restricted to the particular construction shown as equivalent constructions are contemplated and such will be included within the scope of the claims.

Figure 1:
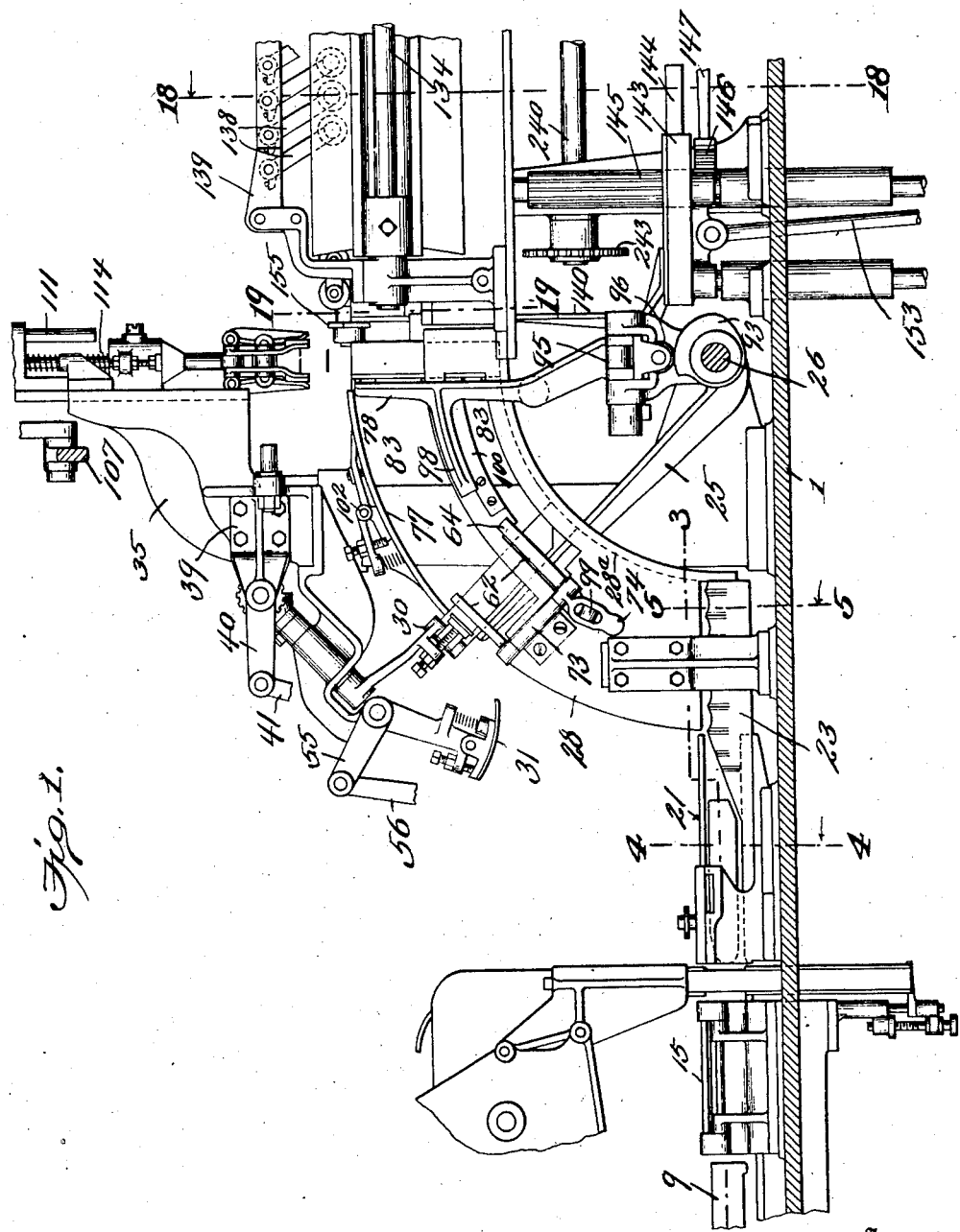
Figure 1 is a side elevation of the main portion of a labeling and stamping machine constructed in accordance with the preferred embodiment of the invention.
Figure 18:
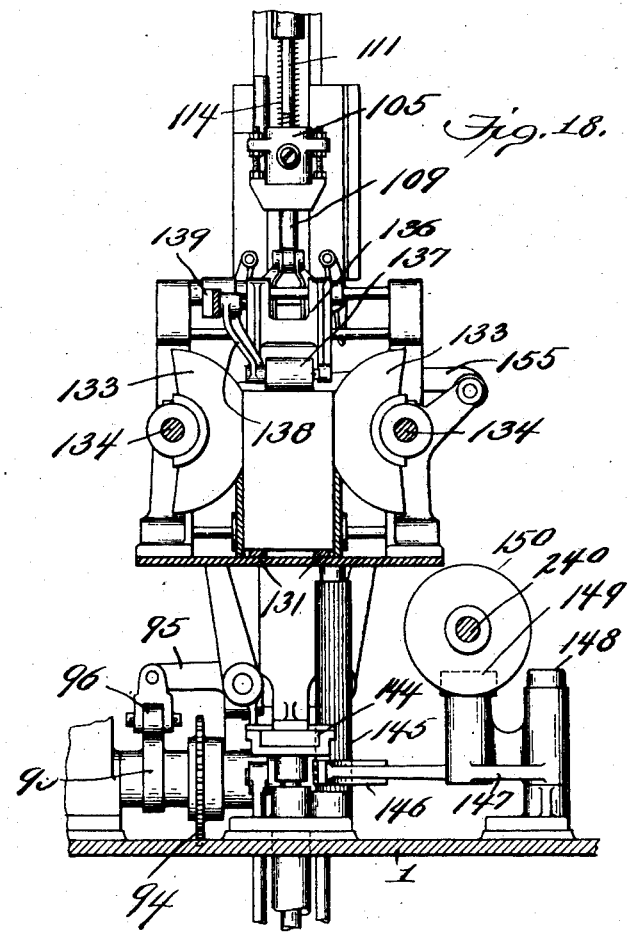
Figure 18 represents a transverse vertical section through the delivery end of the machine on the line 18—18 of Figure 1.
Figure 19:
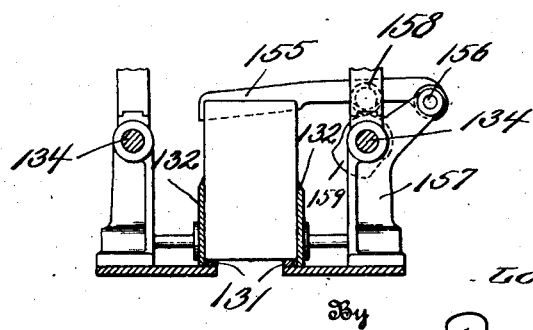
Figure 19 represents a vertical transverse section through the machine on the line 19—19 of Figure 1.

The labeling and stamping mechanisms embodying the present invention are shown in the present instance as mounted on a suitable table or frame 1 (Figures 1 and 2). The labels or wrappers may be fed along a channel 2 by a conveyer 3, the label-feeding and paste-applying means being similar, for example, to that shown and described in the patent to E. L. Bracy No. 1,234,722, granted July 31, 1917. The labels are delivered successively by continuously driven rolls 4 to an upright chute 5 in which each label X, after delivery thereto, is adapted to stand in an upright position with its lower end resting on a stop 6 which may be provided with a screw 7 for adjusting the height of the label in the chute. The intermediate portion of the chute is formed with registered openings 8 through which a package Y is adapted to pass in an endwise direction during the forward stroke of a plunger 9 which may be advanced and retracted at appropriate intervals by a gear segment 10 which meshes with a gear rack 11 on the under side of the plunger, and the gear segment 10 is reciprocated by a pinion 10ª thereon which meshes with a rack 10ᵇ which is reciprocated at appropriate intervals by the face cam 10ᶜ on the shaft 43 of the machine (Fig. 33). The shaft 43 also drives the label feeding means through the chain 3ª.

Packages made up for example of charges of tobacco contained in wrappers which may be closed by folds at the ends thereof, are supplied to a magazine 12 which is supported on and arranged vertically on the upper side of the table, the packages being stacked or arranged in superposed relation in the magazine, with the lowermost package resting on the top of the table. A package-guiding channel 13 extends from the bottom of the magazine to a point which is in front of the plunger 9 when the latter is retracted, as shown in Figure 2, an abutment 14 being arranged at the end of this channel to arrest the movement of the package when it reaches a position in longitudinal alinement with the plunger, and a hinged cover 15 may be provided at this end of the package-guiding channel to prevent upward displacement of the package although affording access to the interior of the channel or the packages therein should occasion therefor arise. A package-ejecting plunger 16 is arranged to reciprocate through the bottom of the package magazine, this plunger as shown comprising a head 17 which is slidable on a guide rod 18 beneath the table, the head being connected by a link 19 to an arm 20 which receives motion from a cam 200 on the continuously driven shaft 201 to cause the plunger 16 to move toward the left in Figures 3 and 6, after the plunger 9 has been retracted, thereby introducing a package into the space opposite to the forward end of the plunger 9. Each stroke of the plunger 16 pushes the lowermost package from the bottom of the stack contained in the magazine 12, the remainder of the stack resting on and being temporarily supported in raised position by the flat top of the plunger 16, and the ejected package is thus caused to push the packages ahead of it in the channel 13 toward the left, thus bringing the foremost package into position to be acted on by the plunger 9. When the plunger 16 is retracted, the stack of packages in the magazine 12 is permitted to drop by gravity on to the bottom of the channel 13.

Each stroke of the plunger 9 toward the right in Figures 1 and 2 causes a package in front of it to be advanced in the same direction. Such advance of the package moves it endwise through the registered openings 8 in the upright label guide 5, and in so doing the foremost end of the package engages the middle or intermediate portion of a label X positioned in the chute, and causes this label to be doubled or folded over the foremost end of the package incident to the passage of the package through the right hand openings 8, carrying the label with it. Figures 24 and 25 show diagrammatically the manner in which the package engages the middle or intermediate portion of the label, and Figure 26 shows the manner in which the label is first folded over the end of the package.

The package with a label doubled or folded thereon, is next received by a folding mechanism comprising a tubular housing 21 which conforms in height and width to the thickness and width of the package, the package with the label thereon being forced endwise through this housing by the plunger 9 during its advancing stroke. This housing contains a pair of end folders 22 which project inwardly from its opposite sides and are spaced from its upper and lower walls, these end folders being spaced apart laterally a distance substantially equal to the width of the package so that as the package is advanced, these folders will engage the corners of the label and will produce the corner folds a shown in Figure 27. Beyond the end folders 22 are arranged a pair of inclined side folders 23, which are adapted to receive the laterally propecting lower edges of the label, as the latter is advanced, and these lower edges of the wrapper will be folded upwardly and against the longitudinal sides of the package as represented at b in Figure 28. The final portion of the advancing stroke of the plunger 9 carries the package, with the partially folded label thereon, to a seat 24 which is formed on the free end of a carrier 25, this carrier being preferably in the form of an arm which is fixed on a shaft 26. A shoulder 27 may be formed on the arm 25 to arrest the advance of each package in a predetermined position on the seat 24. It will be understood that the arm 25 is in its lowered position, as shown in Figure 2 at the time each package is advanced by the plunger 9.

When the package is received on the seat 24, the side folds b of the label will be held in folded position against the respective sides of the package by the side folders 23 which extend longitudinally at opposite sides of the seat 24 although permitting vertical movement of the seat 24 between them. The upper edges of the label, however, project laterally from the top of the package, this being permitted by the said folders 23 the upper edges of which are arranged somewhat below the top of the package, as will be clear from Figure 5, this figure showing the side folders engaged with the longitudinal folds b to hold them in folded relation with the longitudinal edges of the package although permitting the unfolded edges c of the label to project laterally across their upper edges.

The arm 25 operates to swing the package together with the partially folded label thereon into a position to be acted on by mechanism which folds and thus closes the end of the label, and the movement which transfers the package and label to the end folding position is utilized to fold the longitudinal edges $c$ of the label. For this purpose, a pair of guide plates 28 is provided, these guide plates being spaced apart sufficiently to provide a passageway for the package seat 24 and for a package and label thereon. These guide plates are curved concentrically with the shaft 26 which forms the axis about which the package seat 24 swings, and these plates extend downwardly to points slightly above the tops of the side folders 23, as will be clear from Figures 1, 2 and 5. Consequently, upward movement of the package incident to the upward swing of the arm 25 brings the projecting edges $c$ of the label into engagement with the plates 28, and as the movement of the package continues between these plates the latter fold the upper longitudinal edges of the label downwardly and inwardly against the respective longitudinal sides of the package, the label then having the form represented in Figure 29. At this time one end of the package is closed by the label doubled thereover and the adjacent corners and the longitudinal sides of the package are closed by the corner and longitundinal folds, $a$, $b$, and $c$. The opposite end of the label, however, is unfolded, its edges projecting beyond that end of the package, the end of the package being represented by the dotted line $y$ in Figure 29.

Preferably, the package is carried from a horizontal position to a position substantially at an angle of 45° to the horizontal to bring the package into position to effect folding of the end of the label, the arm 25 being shown shifted to bring the package to end-folding position in Figure 1. The label end-folding mechanism which is positioned to effect the end-folding operations comprises a pair of companion folders 29 and 30 which operate concurrently to produce the folds $d$ and $e$ as shown in Figure 30, and a cooperative folder 31 which makes the fold $f$ as shown in Figure 31. The folders 29 and 30, as Figures 15, 16 and 17 show, are fixed on shafts 32 and 33 journaled in a bracket 34 which is fixed on an upright 35 which is bolted or otherwise rigidly secured to the table, these shafts being connected to rotate simultaneously but in reverse directions by intermeshing gear segments 36 which are fixed to the respective shafts. One of these shafts is connected by the bevel gears 37 to a shaft 38, the latter being journaled in a bracket 39 which is also fixed to the rigid standard 35, and this shaft has an actuating arm 40 fixed thereon, this actuating arm being connected by a link 41 to a suitably shaped cam 42 on the operating shaft 43. The folders 29 and 30 are carried by arms 44 and 45 which are fixed on the shafts 32 and 33 respectively, the folders being preferably pivoted to these arms by the pivot pins 46 and 47 and the angular relationship of the folders with the arms 44 and 45 may be adjusted by set screws 48 and 49. The folders are preferably curved to conform substantially with the arcs through which they move during their advancing or folding motions, and the folders are preferably held yieldingly against their set screws by compression springs 50 and 51 which permit the forward or leading ends of the folders to yield to some extent as they move into engagement with the package to effect folding of the label thereon, the folders being thus able to accommodate themselves to slight variations in the position of the ends of the packages and thus avoiding damaging the label or the wrapper. The folder 31 which operates to make the fold $f$, Figure 31, after the folders 29 and 30 have made the folds $d$ and $e$, is mounted on an arm 52 which is fixed in a shaft 53, the latter being suitably journaled in the bracket 34 and provided with an actuating arm 55 which is operated through a link 56 which is actuated by the face cam 56$^a$ on the shaft 43 (Fig. 34). The folder 31 is pivoted on the arm 52 by a pin 58 and is provided with an adjustable stop or set screw 59 and a spring 60 to insure performance of its folding operation without damage to the package or the label notwithstanding the slight variations that may occur in the packages or the positioning thereof with respect to the end-folding mechanisms. The folder 31 is timed to operate after the folders 29 and 30 have made the folds $d$ and $e$ (Figure 30) and have been retracted, and hence the fold $f$ made by the folder 31 will be made against the outer sides of the folds $d$ and $e$, as is shown in Figure 31.

Means is provided for immovably holding the package and its label in end-folding position independently of the arm 25 in order that this arm, after bringing a package to end-folding position may return to its former or initial position ready to receive another package. The guide plates 28 are provided for this purpose with inturned flanges 28$^a$ which form ledges on which the folded bottom of the package may rest, as is shown in Figure 2, and pairs of upper and lower package-holding and positioning arms 61 and 62 are fitted into the guide plates 28 so that they may operate through openings in these guide plates. These arms are formed with projections 65 and 66 which are arranged to be engaged by the forward side of the package as the latter is brought into end-folding position by the upward swing of the arm 25, these projections thus arresting the movement of the package when it reaches the desired position, and these arms are also formed with shoulders 67 and 68 which are arranged to engage the rear side of each package as it is brought into end-folding position, thereby preventing backward displacement of the package when the arm 25 recedes. The arms are yieldingly forced into package-engaging position and yieldingly held in such position by springs 69 and 70 which are interposed between the outer sides of the plates 28 and the extremities of the lower arms, the arms being fixed to shafts 71 and 72 which are pivoted in brackets 73 secured to the outer sides of the plates 28, the springs 69 and 70 acting on the extensions 74 which are continuations of the lower arms. It will be understood that pairs of arms each connected by its respective shaft to swing in unison is provided to engage each package near its upper and lower ends and to thus hold the package immovably in end-folding position while the end-folding mechanism operates thereon. These arms are limited in their inward swing by extensions 63 and 64 which are formed on the lower arms and are arranged to come against the outer sides of the plates 28 under the action of the springs 69 and 70 and hence the arms will not obstruct the movement of a package into end-folding position. Also, to facilitate the introduction of the packages between these arms, the inner sides thereof adjacent to the shoulders 67 and 68 are beveled as at 75 and 76 thus forming inclined surfaces against which the edges of the packages may ride and thus spread the arms apart to receive the package as the latter is brought into end-folding position by the operation of the arm 25.

After the end-folding mechanism has operated to make the folds d, e and f, the package is advanced to a position where a stamp or equivalent device, such as a revenue stamp, is applied, and according to the present invention, the movement of the package incident to its transfer from the end-closing position to the stamping position is utilized to effect the folding of the last end flap of the label or wrapper, it being understood from Figure 31 that the unfolded flap g remains after the flaps d, e and f have been folded. Accordingly, a guard plate 77 is fixed to the guide plates 28 at or adjacent to their outer peripheries, this plate being concentric with the flanges 28ᵃ over which the bottom of the package travels, and this guard plate extends from a point adjacent to the end-folding mechanism to the stamp-applying mechanism. This plate 77 will therefore occupy a position in line with the unfolded upwardly projecting flap g, and as the package is advanced from the end-folding position, the plate 77 will be engaged by this flap g on a line which coincides substantially with the upper end of the package which defines the line of fold of this flap, and this flap will be thus folded down on to the previously folded flaps d, e and f at the upper end of the package, as is shown in Figure 32, thus completing the folding of the label against the end of the package.

The means provided by the present invention for transferring the labeled packages from the end-folding position to the stamping position comprises, preferably, a pair of arms 78 which are carried by a bracket 79 which is fixed to the shaft 26 so that these arms will swing in arcuate paths and in unison with the arcuate-swinging movements of the arms 25. The arms 78 are arranged to operate at the opposite sides of the arcuate package channel formed by the plates 28, and in order to enable these arms to engage and act successively on the packages contained in the channel between these plates, the arms are provided on their inner sides with fingers 80, 81 and 82 which extend inwardly through openings 83 formed in the plates 28, these fingers being positioned to engage the upper and lower portions of the package substantially in the manner represented in Figure 9 and thus insuring the advance of the packages without jamming in the package-guiding channel. The fingers 80, 81 and 82 are spaced to straddle and thus clear the pairs of package-holding arms 61 and 62.

Figure 2 shows the arms 78 in position behind a package occupying the end-folding position, preparatory to the advance of such package to a substantially upright position for stamping, this involving a swing of the arms 78 from the substantially 45° angle in a right hand direction in Figure 2 to bring the package into upright position, as shown in Figure 1, and after the arms 78 have thus transferred a package from the end-closing to the stamping position, these arms swing back toward the left in Figures 1 and 2 and thus bring the arms 78 into a position where the fingers thereon may engage behind another package occupying the end-folding position and which has been advanced to that position by the arm 25 while the preceding package was being transferred to the stamping position. To enable the fingers on the arms 78 to pass the package occupying the end-folding position, during the back swing of the arms 78, these arms are so constructed and operated that they will be relatively separated or spread apart whereby the fingers on these arms will be withdrawn from the package channel between the plates 28 during the backward swing of the arms although the fingers thereon will project into the package channel during the forward or package-advancing swing thereof. For this purpose, the arms 78 are pivoted to swing laterally on their supporting bracket 79, they being shown mounted on shafts 84 the axes of which are transverse to the shaft 26. These arms, moreover, are connected to swing relatively toward and from one another in unison, they being shown provided with lugs 85 and 86 which are integrally or rigidly connected thereto, one of these lugs carrying a pin 87 which operates in a slot 88 in the other lug. By this arrangement, the arms 78 are mechanically connected so that they will swing simultaneously toward and from one another, although the axes of the pivot pins 84 extend transversely of the axis of the shaft 26 and hence the arms, their connecting means and also their supporting bracket will swing as a unit with the shaft 26. The shaft 26, during the operation of the machine, receives a to-and-fro rocking motion through an angle sufficient to swing the arm 25 from its horizontal or package-receiving position up to the 45° position which brings a package to the end-folding position, and to return this arm to its initial or package-receiving position, and to concurrently swing the arms 78 from the point where they engage a package in end-folding position to a substantially upright position which brings such package to the stamping position, and to return these arms to package-receiving position. This will be clear from Figures 1 and 2, Figure 2 showing the arms 25 and 28 in position to receive the respective packages and Figure 1 showing these arms after they have been shifted to bring one package to end-folding position and to transfer the preceding package from end-folding position to stamping position, the return motion of the arms 25 and 78 restoring them from the position shown in Figure 1 to that shown in Figure 2. Any suitable mechanism may be employed to rotate the shaft 26 back and forth through this angle and at appropriate intervals to thus effect the advance or transfer of the packages, the shaft 26 being shown provided in the present instance with a gear pinion 89 which is fixed thereon and a gear segment 90 which is pivoted on a stationary shaft 91 and is arranged to be rocked by a rod or link 92 which may be reciprocated by an appropriately shaped cam 92ᵃ on the shaft 201. The lateral movements of the arms 78 about their pivots 84 may be effected by a cam 93 loosely mounted to revolve on the shaft 26 and this cam may be revolved continuously by a sprocket wheel 94 which may be fixed to it and connected by a chain to the continuously revolving shaft 43. A lug 95 is made integral with or rigidly fixed to one of the arms 78, this lug carrying a roller 96 which rides on the periphery of the cam 93. A compression spring 97 is preferably interposed between the arms 78 to exert a force which acts yieldingly to spread apart or relatively separate these arms. This action of the spring also serves to hold the roller 96 in contact with the cam 93.

The operation of the arms 78 is as follows. Assuming that these arms occupy the position shown in Figure 1 immediately behind a package which has been advanced to the stamping position, and that these arms are held in their inner positions so that the fingers 80 and 81 thereon project into the package channel behind the package in stamping position, the roller 96 will then rest on the high part of the cam 93. At this moment the shaft 26 is rocked to swing the arms 78 toward the left in Figure 1, this being effected by a downward stroke of the rod 92 in Figure 9. This rocking motion of the shaft 26 continues until the arms 78 have returned from the position shown in Figure 1 to that shown in Figure 2. However, while the shaft 26 receives alternate rocking motions in reverse directions, the cam 93 revolves continuously so that at or about the time the reverse rotation of the shaft 26 begins, the high part of the cam 93 is carried past the roller 96, this cam revolving in a right hand direction in Figure 1, and in consequence the arms 78 are relatively separated to an extent which will withdraw fingers 80 and 81 therof from the package channel between the plates 28 and they will be held in such retracted position under the action of the spring 97 throughout the return stroke of the arms 78, thus enabling the spread apart fingers 80 and 81 on these arms to pass a package occupying the end-folding position. Figure 13 shows the arms 78 in the positions which they occupy after they have advanced the package to stamping position and before the return stroke of these arms has commenced, the fingers on these arms being shown projecting into the package channel beyond the package which has been advanced, and Figure 14 shows the arms 78 immediately after they have been retracted and immediately prior to the commencement of their return stroke.

When the return swing of the arms 78 has carried these arms from the position shown in Figure 1 to that shown in Figure 2, the fingers 80 and 81 on these arms are in a plane behind the rear side of a package occupying the end-folding position, and the continuous rotation of the cam 93 will have brought the high part of this cam into engagement with the roller 96, thus forcing the latter upwardly and in consequence causing both arms 78 to swing inwardly and thereby bring the fingers 80 and 81 thereon into the package channel in each of the packages occupying the end-folding position, and the arms 78 are held in their inner positions during the following swing thereof from the position shown in Figure 2 to that shown in Figure 1 to effect the advance of the package from end-folding position to stamping position, by the engagement of the roller 96 with the high part of the cam 93, this cam rotating in unison with the shaft 26 during the swing of the arms 78 from end-folding position to stamping position. The package occupying the end-folding position and which is received by the arms 78 when the latter are swung backwardly and moved inwardly is held by the positioning arms 61 and 62, and in order to release the package from these arms and permit its advance by the arms 78, the latter are provided with extensions 98 which project rearwardly therefrom and are rigid therewith, these extensions being arranged to engage rollers 99 fitted in the extensions 74 of the arms 61 and 62, and as the arms 78 are forced inwardly by the cam 93 to bring the fingers 80 and 81 into position behind the package, the extensions 74 on the arms 61 and 62 are forced inwardly against the action of the springs 69 and 70, the arms 61 and 62 being thus rocked about their pivots 71 and 72, causing the projections 65 and 66 on these arms to be withdrawn from the front of the package, substantially as is shown in Figure 11. During the initial part of the upward swing of the arms 78, the arms 61 and 62 are held in package-releasing position by the continued engagement of the rollers 99 with the extensions 98 on the arms 78, these rollers riding on these extensions as the arms 78 advance, but after the package has been removed from the arms 61 and 62, the rollers 99 become disengaged from the extensions 98 and the springs 69 and 70 then act to return the arms 61 and 62 to their inner positions ready to receive another package when the same is advanced to the end-closing position by the arm 25. Figure 12 shows the package removed from the fingers 61 and 62 and the latter released and returned to their inner package-receiving position. The package is then advanced to the stamping position by the arms 78 as they swing to substantially upright position as shown in Figure 1.

Means is preferably provided for preventing the package from falling back and otherwise becoming displaced after it reaches the stamping position. As shown, a pair of springs 100 are provided, these springs being attached to the respective guide plates 28 and having a normal tendency to project inwardly through openings therein into the package channel, the ends of these springs being so located that they will engage the rear side of the package while the latter occupies stamping position. The package while being advanced to stamping position encounters and spreads apart the springs 100 so that it may pass them without obstruction, but as soon as the package reaches stamping position the ends of the springs 100 ride off the lateral edges of the packages and snap into position behind the package, thus preventing the package from falling back after it has been brought to stamping position. In addition, a spring actuated finger 101 is also preferably provided at the top of the package channel above the guard plate 77, this spring finger being pivoted at 102 to a bracket that may be secured to the upper side of the plate 77, and a spring 103 acts on the finger to press it downwardly so that it will engage and press yieldingly on the top of the package as the latter approaches and assumes the stamping position. This finger is located centrally of the width of the package channel and it engages the last folded end flap $g$ and thus holds the same folded down against the top of the package preparatory to the application of a stamp across the top of the package.

The stamps may be fed to the packages from an appropriate magazine by a reciprocatory gripper 104, an example of mechanism suitable for this purpose being disclosed in my prior Patent No. 1,188,747, granted June 27, 1916. The stamp designated Z is drawn endwise across the top of the package while the end folds thereof are held down by the finger 101, the package at this time being located beneath the stamping mechanism.

The stamping mechanism is preferably mounted on the rigid standard or column 35 of the machine and it comprises a head 105 which is movable vertically in a guide 106 on the standard 35, this head being reciprocated at appropriate intervals by a lever 107 which may be driven from a suitably shaped cam $107^a$ on the shaft 201 and is connected to the head by a link 108. A plunger 109 is fitted to move vertically in the head 105, the upper end of this plunger having an arm 110 fixed thereto and extending laterally therefrom and carrying a guide rod 111 which is fitted to slide vertically in the upper portion of the head 105 and acts to prevent rotation of the plunger. The arm 110 also carries an adjustable stop consisting preferably of a set screw 112 which is arranged in line with a stationary stop or abutment 113 fixed to the stationary guide 106. A compression spring 114, which may encircle the plunger bears at one end against the upper portion of the head 105 and its lower end bears on a shoulder on the plunger 109, this spring thus acting to yieldingly hold the plunger 109 in lowered position relatively to the head 105, and the arm 110 is arranged to abut against the top of the head 105 and thereby limit the downward movement of the plunger relatively to the head.

The lower end of the plunger carries a block 115 the lower portion of which is of a length and width to fit within the side and end walls of a package positioned below it, this block being thus adapted to indent the upper end of the package and to cause the surrounding side and end walls of the package to project upwardly above the indented portion. Means is also provided for crimping these upstanding edges on the package, a pair of side crimpers 116 being pivoted at 117 to the opposite sides of the block and a pair of end crimpers 118 being pivoted at 119 to the opposite ends of the block. The lower edge of the block is provided with a notch 120 which will accommodate the end of the finger 101 which bears on the top of the package, when the plunger is lowered, and the crimper 116 at the respective side of the package will be correspondingly notched to accommodate this finger. Springs 121 which may be fitted into the ends of the block 115 act to yieldingly hold the lower ends of the end crimpers in opened or flared position as shown in Figure 21, and similar springs 122 may be fitted into the sides of the block 115 arranged to act on the side crimpers 116 to yieldingly hold them in relatively separated or flared relation as shown in Figure 20. The spreading movements of the end and side crimpers may be controlled by the set screws 123 and 124 which may engage the stop shoulders 125 and 126 on the block. The head 105 carries actuating means for the crimpers, such actuating means being preferably in the form of a wedge 127 both sides and ends of which are beveled or inclined and are arranged to enter between the rollers 128 on the upper ends of the end crimpers and the rollers 129 on the upper ends of the side crimpers, descent of the wedge between these rollers causing the lower ends of the crimpers to be forced inwardly toward one another and against the sides and ends of the package while the block 115 is pressed into its upper end, this inward movement of the crimpers causing the upstanding side and end walls of the package which surround the lower end of the block to be sharply creased or crimped, thus imparting a set to the lines of fold of the top flaps of the label and overcoming any tendency that these flaps may have to spring open. By crimping the end folds of the package in this manner, displacement of the stamp before drying of the adhesive, due to the tendency of the flaps to spring open, is avoided.

The plunger 109 together with the block and crimpers thereon will be in the raised position shown in Figures 1, 2, 20 and 21 when each package is brought into stamping position. While the plunger is in this position a stamp Z is drawn endwise across the top of the package, by the gripper 104, or by other means, in substantially the manner shown in Figures 20 and 21, the stamp assuming a position centrally of the thickness of the package and with its ends projecting equidistantly from the narrower sides of the package. While the stamp is in this position, the head 105 is lowered by operation of the lever 107. In consequence, the block 115 on the lower end of the plunger will first engage the stamp and as it proceeds downwardly it will press the stamp against the top of the end folds of the label, the last end fold at this time being held down by the finger 101, and the final portion of the descent of the plunger will cause the block 115 to indent or countersink the upper end of the package. At this moment the stop 112 has reached and it engages the stop 113, further descent of the plunger being thereby prevented. The lever 107, however, continues its operation, causing a further descent of the head 105 until the cam or wedge 127 has become interposed between the rollers 128 and 129 of the crimpers and has spread apart these rollers and thus forces the lower ends of the crimpers which, at this time extend down over the four sides of the package, inwardly into engagement with the respective sides of the package, thereby crimping the upstanding edge of the latter against the sides and ends of the block 115. The sharp crimping of the end folds of the label overcomes the springiness of the paper or material composing the label and gives the end folds a tendency to remain in folded position. At the same time, the indenting of the end of the package compacts the contents thereof and overcomes any tendency of the package to open under pressure from its contents.

The descent of the block 115 on the top of the package presses the intermediate portion of the stamp, to the underside of which an adhesive has been applied, on to the folded end thereof, while the folders 118 act upon the portions of the stamp which project beyond the package and bend the ends of the stamp downwardly against the narrow sides of the package. To facilitate this operation, the end crimpers 118 are preferably provided with recesses 118ª which are slightly wider than the stamp and serve to receive and properly guide the stamp against the narrower sides of the package.

After these operations have been performed, the lever 107 moves upwardly thus raising the head 105. The first part of the ascent of the head 105 withdraws the cam or wedge 127 from the crimper actuating rollers, thereby permitting the springs of the crimpers to act to swing the lower ends of the crimpers outwardly so as to disengage from the package. The block 115 attached directly to the plunger 109 is held in engagement with the package by the spring 114 which acts in a manner to hold the stop 112 on the plunger down against the stationary stop 113. After the crimpers have been fully retracted, the continued ascent of the head 105 brings the upper end of this head against the arm 110 on the upper end of the plunger and as the head continues to rise, the plunger 109 is caused to rise in unison therewith. This upward motion of the plunger elevates the block 115 and the crimpers attached thereto so that these parts are raised clear of the package and the latter is then free to advance.

Figure 35:
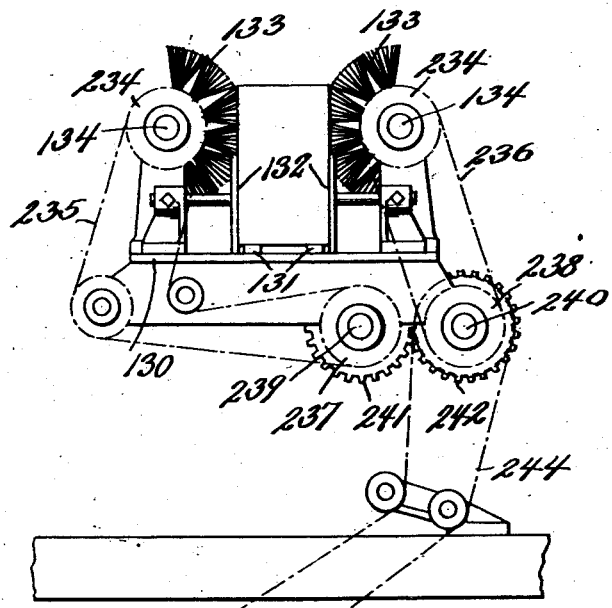
Figure 35 is a detail of the driving means for the stamp-affixing brushes.

The stamped packages are received preferably by a table with which is associated means for pressing the intermediate portions of the stamps down upon the tops of the packages and means for insuring the affixing of the ends of the stamps against the sides of the package. As shown in Figures 1, 2, 18, 19 and 35, a table 130 is provided which is suitably mounted in fixed position above the bed or table 1, this table 130 having a pair of rails 131 on which the bottoms of the packages are adapted to rest and along which they are adapted to advance. The table has sides 132 which form a package passageway along which a row of the packages with their flat sides against one another is adapted to advance. Segmental bristle brushes 133 are preferably mounted on shafts 134 arranged at opposite sides of the package passageway in this table, these brushes being suitably driven so that they revolve continuously but in opposite directions, the inner peripheries of the brushes moving downwardly and occupying positions where they will engage and exert a downward brushing action upon the ends of the stamps on the packages contained in the passageway and also upon the side folds of the wrappers to affix the same. As shown in Fig. 35, these brushes are driven continuously but in opposite directions by the sprocket wheels 234 fixed on their shafts, the sprocket chains 235 and 236 which pass over them and around the sprocket wheels 237 and 238 on the shafts 239 and 240, and these shafts are connected to revolve in opposite directions by the gears 241 and 242. Motion is imparted to the shaft 242 from a sprocket wheel 243 and a sprocket chain 244 which is driven by a sprocket wheel 245 on the continuously driven shaft 201. Above the package passageway in this table are also mounted pressing rollers 135 which are carried by a frame 136 and which are adapted to rest by their weight upon the tops of the passages first introduced into the package passageway, and a series of supplemental rollers 137 hung upon links 138 attached to a bar 139 supported longitudinally above the package passageway act to press downwardly by their own weight upon the tops of the packages as the latter proceed along the passageway. These rollers bear upon the intermediate portions of the stamps and end flaps of the packages and thus act to hold these parts in proper place until the adhesive securing the stamps and the end folds of the label has set.

Figure 36:
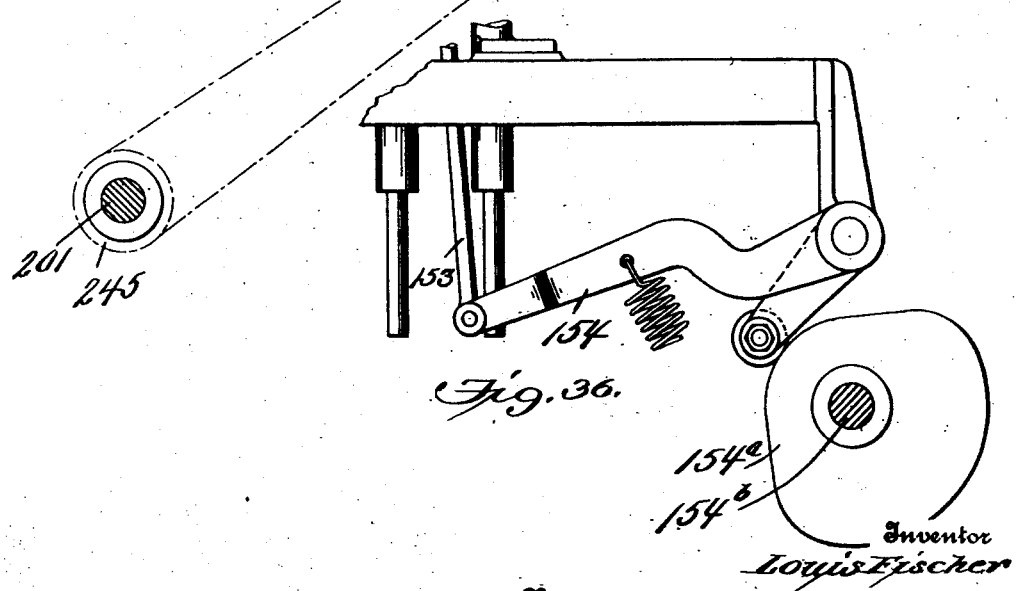
Figure 36 is a detail view showing part of the driving means for the arm which advances the row of labeled and stamped packages.
Figure 37:
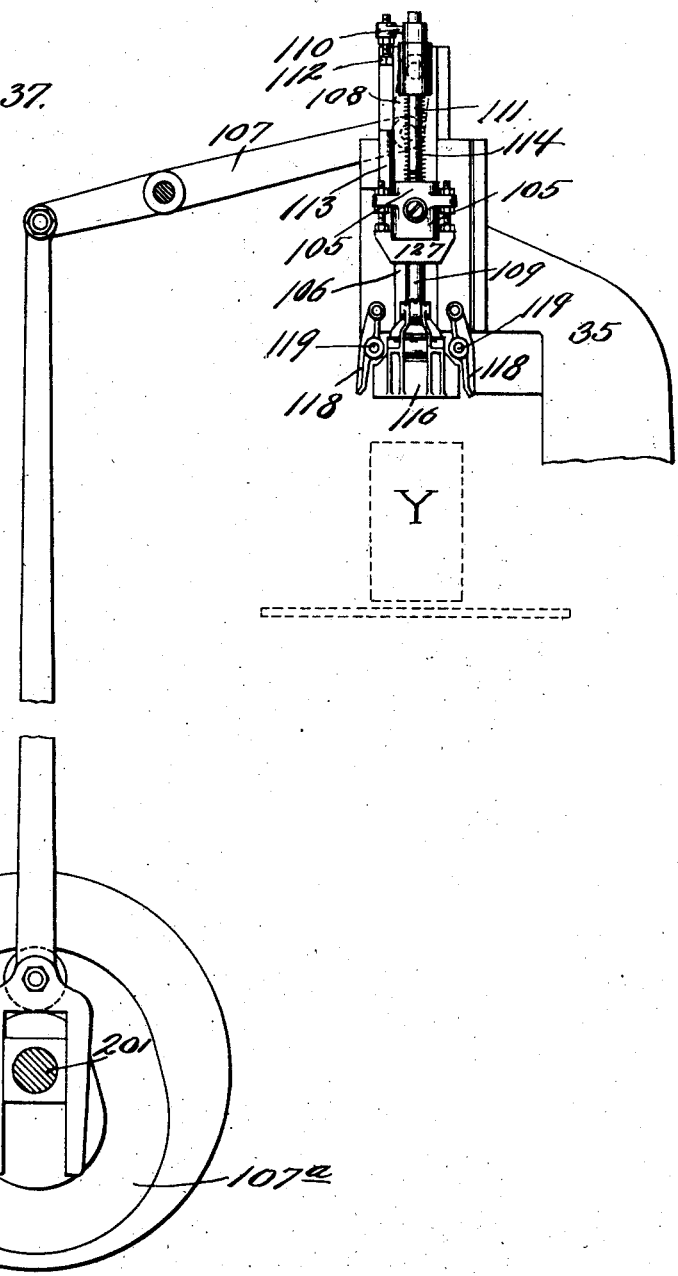
Figure 37 is a detail view showing the driving means for the stamper.

Means is provided for successively removing the stamped packages from indenting, crimping and stamping position and for intermittently advancing a row of stamped packages along the table 130. Such means consists in the present instance of an arm 140 which is movable vertically and longitudinally in a slot 141 formed in that end of the table 130 which receives the packages from the stamping position. This arm is in retracted position while a package is being brought to end indenting, crimping and stamping position, but after the package has been stamped, said arm rises to engage behind the stamped package, it then moves forwardly thereby transferring the stamped package to the table 130, the arm is then lowered to remove it from the path of the packages and it is finally returned to its initial or starting position ready to rise and engage the next package after it has been stamped. To impart these movements to the arm 140, said arm is preferably attached to a slide 142 which reciprocates longitudinally in a guide 143. One side of the slide is formed with rack teeth 144 which mesh with a vertically elongated pinion 145, the latter being suitably journalled between the table 1 and the table 130. A gear segment 146 meshes with the pinion 145, this gear segment being fixed to an arm 147 which is pivoted on the stationary part or table 1 at 148, the arm carrying a roller 149 which bears on a suitably shaped cam 150 on the shaft 240 which is connected to revolve continuously and at equal speed with the brushes  The guide 143 is movable vertically, the rack teeth on the slide 142, however, remaining in mesh with the pinion 145 during such vertical movements. As shown the slide 143 has rods 151 fixed to it and sliding vertically in guides 152 mounted on the table 1, and the guide 143 is reciprocated vertically at appropriate intervals by a connecting rod 153 and actuating arm 154, the latter being raised and lowered at appropriate intervals by a suitably shaped cam 154$^a$ on the continuously driven shaft 154$^b$ (Fig. 36).

In operation, after a package has been indented, crimped and stamped, the arm 154 swings upwardly while the arm 140 is in the left hand position shown in Figure 2, the arm 140 being thus raised to a position behind the package which occupies indenting, crimping and stamping position. While the arm 140 is held in raised position it is shifted toward the right by operation of the gear segment 146, and this operation of the arm 140 causes it to push the package from the indenting, crimping and stamping position toward the right in Figure 2 against the row or stack of packages contained on the table 130 and the package engaged by the arm 140 is shifted far enough to push ahead of it the row of packages for a distance equal to about the thickness of a package. After this advancing stroke of the arm 140 has been completed, said arm is lowered by descent of the arm 154, the arm 140 being thus removed to a level below the packages, and the arm 140 is then shifted toward the left or into the position shown in Figure 2 by operation of the gear segment 149.

Means is provided for preventing the last package introduced into the row on the table 130, from falling backwardly. Such means comprises a finger or blade 155 which is pivoted at 156 to a bracket 157 mounted at one side of the package passageway, this arm carrying a roller 158 which rests on a cam 159 attached to the shaft 134 of one of the stamp-affixing brushes. The cam 159 is of such shape that it will lift the finger or blade 155 clear of the top of the packages once during each revolution of the corresponding brush shaft and will hold this finger or blade in raised position while the arm 140 is pushing another package on to the table 130, after which the finger or blade 155 will drop into a position behind the package last introduced, thereby preventing it from dropping or falling backward. It will be understood that the brushes 133 act to brush the ends of the stamps downwardly against the narrow sides of the packages in the row on the table 130 during the intervals of rest of the packages, the cutaway portions in the peripheries of these brushes being presented to the packages while the packages are being advanced by the arm 140, so that the ends of the stamps will not be displaced during the advance of the packages.

The mode of operation of the labeling and stamping mechanism constructed as hereinbefore described is as follows. The labels which are to form the wrappers of the packages are fed in succession along the table 2 by the continuously travelling conveyer 3, the label feeding mechanism including suitable gumming means which applies lines of gum or paste $x$ to the longitudinal margins of the label and a spot of gum or paste $x'$ to the portion of the label which is to form the last top fold $g$. The gummed labels are fed successively between the rollers 4 and drop endwise into the chute 5, each label standing in upright position in the chute on the stop 16 at the bottom thereof, as is represented in Figure 2. The reciprocatory slide 16 operates to remove the packages Y successively from the bottom of the magazine 12, and as each package is moved by a movement to the left in Figures 3 and 6, the removed package engages the packages contained in the channel 13 ahead of it and these packages are advanced so that the foremost package in the row is brought against the stop 14 in front of the reciprocatory flange 9 while the latter is retracted. Figures 3 and 6 show the plunger 9 in retracted position but ready to advance after a package has been placed in front of it, and the plunger 16 has been retracted, allowing the packages in the magazine 12 to descend preparatory to the feeding of another package therefrom.

The plunger 9 is next shifted toward the right in Figures 1 and 2, it being thereby caused to engage the package in front of it and to push this package endwise through the openings 8 in the middle of the chute 5 and through the housing or former 21 and to carry the package on to the seat 24 of the arm 25. As the package passes through the openings 8 in the chute, its end engages the middle of the label, as is shown diagrammatically in Figures 24 and 25, and the passage of the package through the openings 8 causes the label to be doubled and drawn through the right hand opening 8 in the chute, the result of which is to double or fold the label against the top and bottom flat sides of the package. As the advancing movement of the plunger 9 continues, the package while advancing therewith carries the label into position to be engaged first at the forward corners by the corner folders 22 which make the corner folds $a$ Figure 27 after which the folders 23 engage the lower laterally projecting longitudinal edges of the label and make the folds $b$, Figure 28, and the package with the label partially folded thereon is eventually brought by the plunger 9 on to the seat 24 and against the stop 27 on the arm 25, said arm at this time being in its lowered or horizontal position as shown in Figure 2. Immediately after the plunger 9 has completed its advance, it is retracted or returned to the position shown in Figures 1 and 2, thus clearing the rear end of the label on the package resting on the seat 24.

Immediately following retraction of the plunger 9, the arm 25 is swung upwardly from its horizontal position shown in Figure 2 to a position at approximately 45° thereto, as shown in Figure 1, this motion of the arm 25 being effected by rotation of the shaft 26 to which it is fixed, through an upstroke of the rod 92 which actuates the gear segment 90 and the pinion 89, the latter being fixed on the shaft 26. Concurrently with the swing of the arm 25 from the horizontal position to the 45° position, the arms 78 swing from the 45° position to a substantially vertical position, as shown in Figure 1, the arms 78 being fixed to the shaft 26. The initial part of the upward swing of the arm 25 brings the unfolded upper longitudinal edges which project laterally from the package, as will be understood from Figure 28 against the lower edges of the guide plates 28, and as the package is carried upwardly between these plates, these edges of the label will be turned against the narrow longitudinal sides of the package to form the original folds $c$ shown in Figure 29. As the package approaches the 45° position at which the end folding of the label is to be performed, the forward corners of the package will ride over the inclined surfaces 75 and 76 of the spring-pressed arms 61 and 62 and the package will eventually become seated between these arms and held between the shoulders or projections 65 and 66 at the front and 67 and 68 at the rear. While the package is held immovably by the arms 61 and 62, the shoulders 29 and 30 swing simultaneously inwardly acting on the portions of the label at the narrow sides of the package and which project from the upper end thereof and fold these portions of the label inwardly to form the end folds $d$ and $e$, immediately following which the folder 31 swings into engagement with the portions of the label at the rear side of the package and which projects from its upper end and bends this part of the label down to form the end fold $f$.

During the upward swing of the arm 25 to carry a package with its partially folded label into the end folding position, the arms 78 swing upwardly to carry a preceding package from the end-folding position to stamping position, such package being engaged at its rear side by the inwardly projecting fingers 80, 81 and 82 on the arms 78. During this operation of the arms 78, the latter are held in their inner positions by the roller 96 which rests on the high part of the cam 93, this cam rotating in unison with the shaft 26 while the latter is rotating to swing the arms 25 and 78 in package-advancing direction. The initial part of the package-advancing movement of the arms 78 causes the remaining upstanding end of the label at the forward flat side of the package to come against and to be folded down by the adjacent edge of the guide plate 77, thus forming the final end fold $g$, Figure 22, and this final end fold which is superposed on the previous end folds $d$, $e$ and $f$ is held in folded position as it rides beneath the guide plate 77. As the package approaches stamping position it spreads apart and passes between the springs 100 and as soon as the package reaches stamping position, these springs snap inwardly behind the package and thereby act to prevent the package from falling backwardly. Also, as the package approaches stamping position its upper end passes beneath and forces upwardly the finger 101 against the action of its spring 103, this finger riding over and remaining in engagement with the initial top fold $g$, thus holding this end fold as well as the other end folds beneath it in folded position.

Immediately after the arms 78 have advanced the package from end-folding position to stamping position, the shaft 26 is rocked in a reverse direction by the down stroke of the rod 92 Figure 2, and this motion of the shaft 26 in conjunction with the continued forward rotation of the cam 93 causes the roller 96 to pass off the high part of the cam, thereby permitting the spring 97 to relatively spread apart the arms 78, this operation withdrawing the fingers 80, 81 and 82 from the package passageway between the plates 28. During the reverse rotation of the shaft 26, the arm 25 is returned to its horizontal position to receive the next package advanced by the plunger 9, and by the same operation, the arms 78 are returned to position to receive a package occupying the end-folding position. As the arms 78 approach the limit of their backward swing, the roller 96 begins to ride up on to the high part of the cam 93 whereby the arms 78 are moved inwardly or toward one another thus bringing the fingers 80, 81 and 82 into the package passageway in rear of the package held in end-folding position between the arms 61 and 72, and as this inward movement of the arms 78 continues, the extensions 98 on said arms engage and press inwardly on the rollers 99 attached to the arms 61 and 62, in consequence of which the package-engaging ends of these arms are spread apart to release the package from these arms. As the arms 78 advance to carry the package to stamping position, the extensions 98 on these arms ride off the rollers 99, thus releasing the arms 61 and 62 and permitting them to return to package-engaging position under the action of the springs 69 and 70. The retraction of the arms 61 and 62 by the relative inward movement of the arms 78 is illustrated diagrammatically in Figure 11 and the release of the arms 61 and 62 so that they may engage the next following package as illustrated diagrammatically in Figure 12.

Immediately after a package has been brought to indenting, crimping and stamping position, a stamp X is drawn longitudinally across the folded upper end of the package by the reciprocatory gripper 104 or other suitable means, and when the stamp has been fed to a point where the middle portion of its length is directly above the package, as is shown in Figure 21, the head 105 is lowered by operation of the lever 107. The plunger 109 is thus lowered, bringing the block 115 thereon into engagement with the middle portion of the stamp and causing this portion of the stamp to be pressed firmly down upon the end folds of the package, the last end fold $g$ having been held in folded position by engagement therewith of the finger 101, and the plunger 109 descends until the stop 112 connected to it comes against the stationary stop 113, at which point the block 115 will have indented the upper end of the package substantially as is shown in Figures 22 and 23. The descent of the plunger 109 to bring the block 115 into engagement with the end of the package also brings the crimpers 116 and 118 into positions where they extend downwardly past the upstanding edge of the package which surrounds the block 115, although at this time the crimpers are spread apart at their lower ends to insure proper reception of the upper end of the package between them. As the descent of the head 105 continues, the block 115 and the crimpers will be held from further descent by the stops 112 and 113, but the wedge or cam 127 is lowered so that it engages the rollers 128 and 129 on the upper ends of the crimpers and spreads these rollers substantially as shown in Figures 22 and 23, the lower ends of the crimpers being thereby forced inwardly or laterally toward one another and thus causing the crimpers to firmly compress or crimp the upstanding edge of the package between the crimpers and the block 115. The initial part of the ascent of the head 105 withdraws the wedge or cam 27, thereby releasing the crimpers and allowing them to open under the action of their springs, and the further ascent of the head 105 elevates the plunger 109 thus retracting the block 115 and also the crimpers from the package. It will be understood that the crimpers 118 which act upon the narrow sides of the package act upon the ends of the stamp which project beyond the package and bend these portions of the stamps down against the narrow sides of the package.

Immediately after indenting, crimping and stamping of the package has been completed, the arm 140 is raised by the upstroke of the arm 154 and connecting rod 153, thus bringing the arm 140 into position behind the package occupying stamping position, and the arm 140 is then reciprocated toward the right in Figure 2 under the action of the gear segment 146 which actuates the pinion 145, the package being thus advanced from the indenting, crimping and stamping position on to the table 130 and against the row of stamped packages thereon, in consequence of which the row of stamped packages is advanced a distance equal substantially to the thickness of a package. Immediately prior to the package-advancing stroke of the arm 140, the retaining blade 155 is raised following the action of the cam 159 so that this blade will not obstruct the advance of this package. After the package has been advanced, the blade or finger 155 is permitted to descend so that it engages behind the last package in the row on the table 130, thereby preventing this package from falling backwardly, and the arm 140 then descends through a down stroke of the arm 154, after which the gear segment 149 operates to shift the arm 140 toward the left or into the position shown in Figure 2 in which position this arm remains until it is actuated to advance the next following package from the indenting, crimping and stamping position.

The stamped packages on the table 130 pass beneath the series of rollers 135 and 137 which bear on their upper ends and thereby press the gummed stamps firmly against the end folds of the packages, and the last end folds $g$ of the packages which have the paste spots $x'$ on their under sides are pressed against the end folds beneath them, the rollers thus serving to insure firm adherence of the stamps and sealing of the end folds of the packages. Also the brushes 133 act to brush downwardly the ends of the stamps which extend downwardly along the exposed narrow sides of the packages during the periods of rest which intervene the advancing movements of the packages, the brushes therefore insuring firm and uniform affixing of the stamps to the packages.

I claim as my invention:—

1. In a machine of the class described, the combination of means for advancing a package and a label, means for partially folding the label on the package during its advance, leaving unfolded portions of the label projecting from opposite sides of the package laterally of the direction of advance thereof, means for transferring the package and label to label end-folding position, and means arranged to act on said laterally projecting unfolded portions of the label to fold them against the package during the movement of the package to label end-folding position.

2. In a machine of the class described, the combination of means for folding a label on a package whereby unfolded portions of the label project from opposite sides of the package laterally of the direction of advance thereof, mechanism for folding the ends of the label, means for transferring the package and label from said folding means to said end-folding mechanism, and plates between which the packages are guided during such transfer, said plates being operative on the said laterally projecting unfolded portions of the label to fold them and to retain them in folded position during said transfer.

3. In a machine of the class described, the combination of means for advancing a package endwise, means for folding a label on the package during said advance, leaving an unfolded portion of the label projecting laterally of the direction of advance of the package, mechanism located in offset position with respect to the direction of said advance for folding the ends of the label, means for swinging the package and label laterally to bring it into operative position with respect to said end-folding mechanism, and means operative during said lateral swing of the package to fold said laterally projecting portion of the label.

4. In a machine of the class described, the combination of means for advancing a package and label endwise, means for folding a label on the package during said advance, leaving a portion of the label unfolded and projecting laterally of the direction of advance of the package, a folding member, mechanism for folding the end of the label on the package, and a member pivoted to swing the package and label laterally past said folding member to fold said laterally projecting portion of the label and to bring the end of the package and label in position for operation thereon by said end-folding mechanism.

5. In a machine of the class described, the combination of means for advancing a package endwise, means for folding a label on the package during its advance, leaving opposite portions of the label unfolded and projecting laterally of the direction of advance of the package, folding members, mechanism for folding the end of the label, and an arm pivoted to swing the package and label in a direction laterally past said folding members to fold said laterally projecting portions of the label and to bring the package and label in cooperative relation with said end-folding mechanism.

6. In a machine of the class described, the combination of a horizontal passageway, means for advancing a package longitudinally along said passageway, means for applying a label to the foremost end and for folding longitudinal portions of the label against the longitudinal edges of the package during its advance along said passageway, leaving other longitudinal portions of the label unfolded and projecting laterally from the longitudinal edges of the package, folding means for said unfolded laterally projecting portions of the label, an arm movable into a position at the end of said passageway to receive a package and label therefrom and pivoted to swing the package and label in an arcuate path past said folding means and toward an upright position thereby effecting folding of said unfolded laterally projecting portions of the label, and mechanism positioned to act on the upper end of the label to fold it against the package.

7. In a machine of the class described, the combination of means for advancing a package longitudinally, means for folding a wrapper on the package during such advance, leaving unfolded portions of the wrapper projecting laterally from the opposite longitudinal edges of the package, opposed folders, means located in angular relation to the direction of said advance for holding the package in position for closing the end of the label thereon, and a member operative to swing the package through an arcuate path past said opposed folders to fold said projecting portions of the wrapper and for transferring the package and wrapper from said folding means to said holding means.

8. In a machine of the class described, the combination of means for advancing a package horizontally, means for folding a label thereon, means located above and at an inclination to said folding means for closing the end of the label on the package, an arm pivoted to swing into a horizontal position to receive a package and label from said folding means and to swing into an inclined position to carry the package and label into cooperative relation with said end-closing means, stamp-applying means located in upright position beyond said end-folding means, and reciprocatory means operative to transfer a package from the end-closing means to the stamp-applying means while said arm is operating to carry another package to said end-closing means.

9. In a machine of the class described, the combination of label-folding means, means for advancing a package and label therethrough, means for closing an end of the label on the package, means for applying a stamp to the closed end of the label, and a pair of members connected to operate concurrently, one of said members transferring a package and label from the label-folding means to the label end-closing means and the other member transferring a package and label from the label end-closing means to the stamp-applying means.

10. In a machine of the class described, the combination of label-folding means, means for advancing a package and label therethrough, means for closing an end of the label on the package, means for applying a stamp to the closed end of the label, the label end-closing means and the stamp-applying means being arranged in angular relation, and reciprocatory means operative to receive and carry one package and label into label end-closing position and for concurrently receiving and transferring another package from label end-closing position to stamping position.

11. In a machine of the class described, the combination of label-folding means, means for closing an end of the label on a package, means for applying a stamp to the closed end of the label, an arcuate package guide extending between the folding means, label end-closing means and stamp-applying means, and members pivoted to swing concentrically within said arcuate guide and operative respectively to transfer a package and label from the folding means to the label end-closing means and from the latter means to the stamp-applying means.

12. In a machine of the class described, the combination of an arcuate package guide, means arranged intermediately of the length thereof for closing an end of a label on a package, means arranged toward an end of said guide for applying a stamp to the closed end of the label, and a pair of reciprocatory members for successively receiving and advancing a package through said guide to bring it successively to the label end-closing means and the stamp-applying means.

13. In a machine of the class described, the combination of label-folding means, means for closing an end of a label on a package, means for applying a stamp to the closed end of the label, an arcuate guide extending from the folding means past the label end-closing means to the stamp-applying means, and reciprocating means for advancing a package and label step-by-step through said guide.

14. In a machine of the class described, the combination of means for folding a label against the sides of a package, means for folding an end of the label, means for transferring a package and label from the first-mentioned folding means to the end-folding means, guide plates extending between the first-mentioned folding means and the end-folding means, said guides being operative to fold the label against opposite sides of the package and to maintain said folds until the package and label reach the end-folding means, means for removing the package and label from the label end-folding means, and a guard operative to fold an end portion of the label against the respective end of the package and to hold such end portion in folded position.

15. In a machine of the class described, the combination of label side folding means, stamp-applying means arranged in angular relation with said folding means, label end-folding means arranged at an angle intermediate the side folding means and stamp applying means, and means operative to successively receive and advance a package and label from the side-folding means to the label end-folding means and from the latter means to the stamp-applying means.

16. In a machine of the class described, the combination of label-folding means, guides forming a passageway for directing a package and label to said folding means, and means operative to receive and hold a package in label-folding position embodying opposed arms at the sides of said passageway to receive the package between them, and means yieldingly forcing said arms relatively toward one another.

17. In a machine of the class described, the combination of label-folding means, means forming a passageway for the advance of a package and label to said folding means, arms having means for yieldingly forcing them inwardly from the opposite sides of said passageway, said arms being recessed at their inner sides to receive and hold a package in folding position, and means for removing the package from folding position, said means being operative to retract said arms to cause release of the package prior to its removal from folding position.

18. In a machine of the class described, the combination of folding means, opposed arms operative to grip and hold a package and label in cooperative relation with said folding means, reciprocating members for removing the package and label from folding position during their forward stroke, said members having means for relatively separating them during their return stroke to pass the package occupying end-folding position prior to their engagement with such package and for moving them relatively toward one another to retract said opposed arms and to engage the package.

19. In a machine of the class described, the combination of label-folding means, means for holding a package and label in cooperative relation therewith, and means for removing the labelled package from said folding means comprising a pair of arms connected to reciprocate in unison and also movable relatively toward and from one another in a direction transverse to their direction of reciprocation.

20. In a machine of the class described, the combination of label-folding means, a passageway for guiding a package and label thereto, means for holding the package and label in folding position, and means for removing the labelled package from such position embodying a pair of arms mounted to reciprocate lengthwise of said passageway and also movable relatively to one another in a direction transversely of said passageway whereby said arms will be withdrawn from the passageway to clear a package occupying folding position during the return strokes of the arms and will project into said passageway behind a package therein during their forward strokes.

21. In a machine of the class described, means for folding the end portions of a label against the respective end of a package comprising folder plates, and arms operative to swing the folder plates laterally into positions opposite the end of the package to fold the label thereon, the folder plates being angularly adjustable on their arms to accommodate them to the length of the package and having means for setting them in different adjusted positions.

22. In a machine of the class described, label end-folding means comprising a pivoted actuating arm, a folder plate pivotally mounted thereon and operative, during the swing of said arm to fold an end portion of a label against an end of a package, a spring acting on the folder plate to swing its forward end toward the end of the package, and an adjustable stop for limiting the motion of the folder plate under the action of the spring.

23. In a machine of the class described, the combination of wrapper top fold crimping means, means for bringing a package having top folds into position for crimping of said top folds, and a member which overlies one edge only of the top of the package and holds the top folds in folded condition during the crimping of the top folds of the package.

24. In a machine of the class described, the combination of wrapper end fold indenting means, means for feeding thereto a wrapped package having superposed end folds, and a finger arranged to project toward one side and overlie one edge only of the package and rest on the top-most end fold of the package to hold such fold against the end of the package during the indenting operation.

25. In a machine of the class described, a block operative to indent the folded end of a label or wrapper on a package, and cooperative means for crimping the edge of the label surrounding the indentation.

26. In a machine of the class described, the combination of a block movable into indented relation with the folded end of a label or wrapper on a package, and crimpers operative to crimp the top edge of the label between them and the block.

27. In a machine of the class described, the combination of a block operative to form an indentation in the folded end of a package label or wrapper and to cause the top edge of the label to stand up around the circumference of the block, crimpers operative to clamp the upstanding edge of the label against the sides of the block, and means for actuating the crimpers while the block is in indented relation with the label.

28. In a machine of the class described, the combination of a plunger carrying a block adapted to admit a stamp beneath and movable into indented relationship with the folded end of a label or wrapper on a package, and crimpers pivotally mounted at the sides and ends of said block and relatively movable toward it to crimp the top edge of the label between them and said block, a pair of said crimpers being notched to receive the end portions of the stamp and to direct such portions of the stamp against the respective sides of the package.

29. In a machine of the class described, the combination of a reciprocating head, a plunger movable in unison therewith and carrying a block operative to indent the folded end of a label or wrapper on a package, crimpers also carried by said plunger and movable into positions to act on the outer sides of the label adjacent to the top thereof, means for arresting the movement of the plunger at a predetermined point in the movement of said head, and means carried by said head and operative by the continued movement thereof to actuate the crimpers.

30. In a machine of the class described, the combination of wrapper folding mechanism including top fold indenting means, top fold affixing means, a table along which a row of wrapped packages is adapted to advance during affixing of the top folds of the wrappers thereof, and means for successively transferring the packages from said indenting means to said affixing means and for advancing the packages on the table comprising an arm, means for moving said arm first in a direction transversely of the row of packages to bring it behind a package in top fold indenting position, then in a longitudinal direction to feed such package on to the table and to advance the row, then in a transverse direction to remove it from the path of the packages, and finally in a longitudinal direction opposite to the direction of advance of the packages.

31. In a machine of the class described, the combination of wrapper folding mechanism including top fold indenting means, top fold affixing means, a table along which a row of wrapped packages is adapted to advance during affixing of the top folds thereof, means operative to successively transfer packages from said top fold indenting means to the top fold affixing means and to advance the packages in a row longitudinally, and means arranged to engage behind the upper end of each package as the same is introduced into the row to prevent falling back of said package toward the top fold indenting means.

32. In a machine of the class described, the combination of wrapper folding mechanism including top fold indenting and crimping means, top fold affixing means, a table along which wrapped packages are adapted to advance in a row during affixing of their top folds, a member operative to successively remove the packages from the top fold indenting and crimping means and to introduce them into the row and to advance the latter past the top fold affixing means, and a finger arranged to move into position behind each package after the latter has been removed from the top fold indenting and crimping means and introduced into the row and having means for retracting it from the path of each package prior to the introduction of said package into the row from the top fold indenting and crimping means.

33. In a machine of the class described, the combination of wrapper folding mechanism including means for folding the sides of the wrapper, a table along which a row of wrapped packages is adapted to advance, a member operative to successively remove the packages from the wrapper folding mechanism and to introduce them into the row and to intermittently advance the row, brushes operative on the sides of the wrapped packages in the row during the periods of rest intervening the intermittent advance of the row of packages to affix the side folds of the wrappers thereon, and a finger movable into position behind each package after the same has been removed from the wrapper folding mechanism and introduced into the row and having means for withdrawing it from the path of each package prior to its removal from the wrapper folding mechanism.

In testimony whereof I have hereunto set my hand.

LOUIS FISCHER.